Sept. 6, 1932.  A. L. FORBES, JR., ET AL  1,875,716
SEPARATING PLANT
Filed March 17, 1930   3 Sheets-Sheet 1

Inventors
Arthur L. Forbes Jr.
Clarence O. Byrne

By
Hardaway Tathey
Attorney

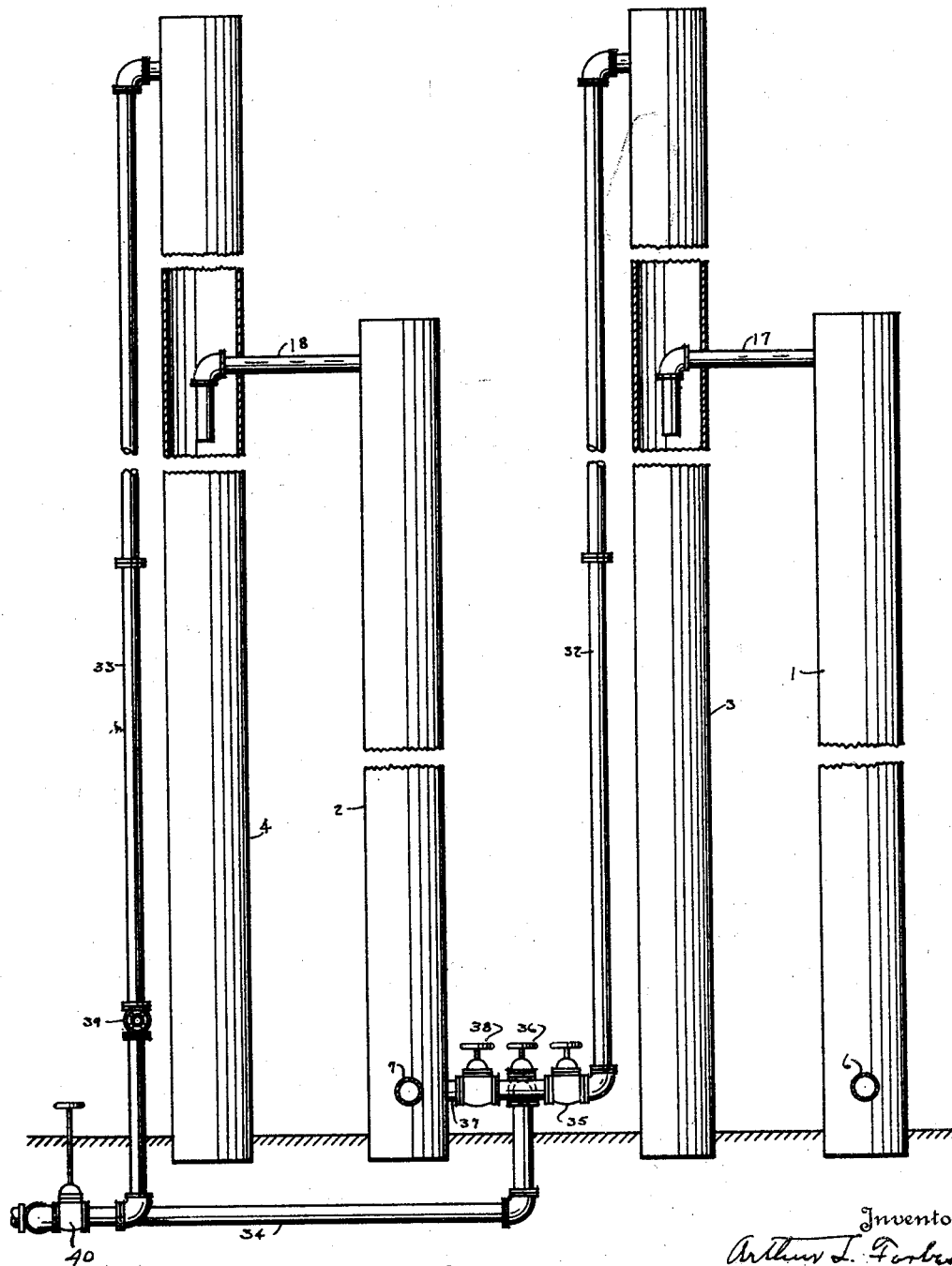

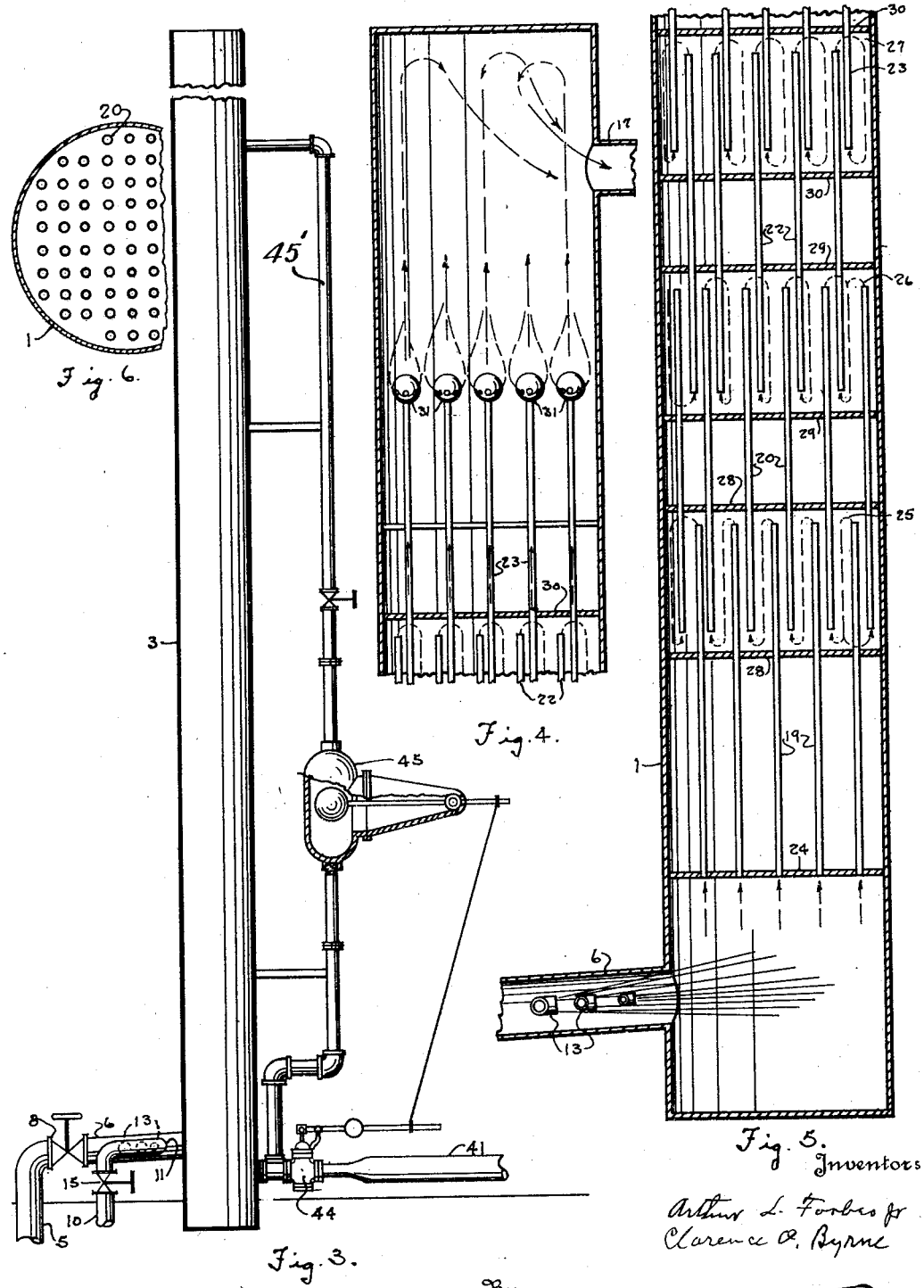

Patented Sept. 6, 1932

1,875,716

UNITED STATES PATENT OFFICE

ARTHUR L. FORBES, JR., AND CLARENCE O. BYRNE, OF EL PASO, TEXAS

SEPARATING PLANT

Application filed March 17, 1930. Serial No. 436,464.

This invention relates to new and useful improvements in a separating plant.

One object of the invention is to provide apparatus of the character described which has been specially provided for the purpose of separating hydrogen sulphide from natural gas and the invention comprehends also a particular type of scrubbing tower employed.

Another object of the invention is to provide apparatus of the character described which may be used generally for separating gases from liquids and vice versa, and more particularly for separating hydrogen sulphide from natural gas, as hereinabove stated or for separating gasoline from natural gas and other similar purposes.

With the above and other objects in view the invention has particular relation to certain novel features of construction, operation and arrangement of parts, an example of which is given in this specification and illustrated in the accompanying drawings, wherein:

Figure 2 shows a side view thereof, partly in section, taken on the line 2—2 of Figure 1.

Figure 3 shows a side view of the separating tower showing the liquid level controller, associated therewith, partly in section.

Figure 4 shows a vertical sectional view of the upper end of the scrubbing tower.

Figure 5 shows a vertical sectional view of the lower end thereof, and

Figure 6 shows a fragmentary horizontal sectional view of the scrubbing tower.

Figure 1:
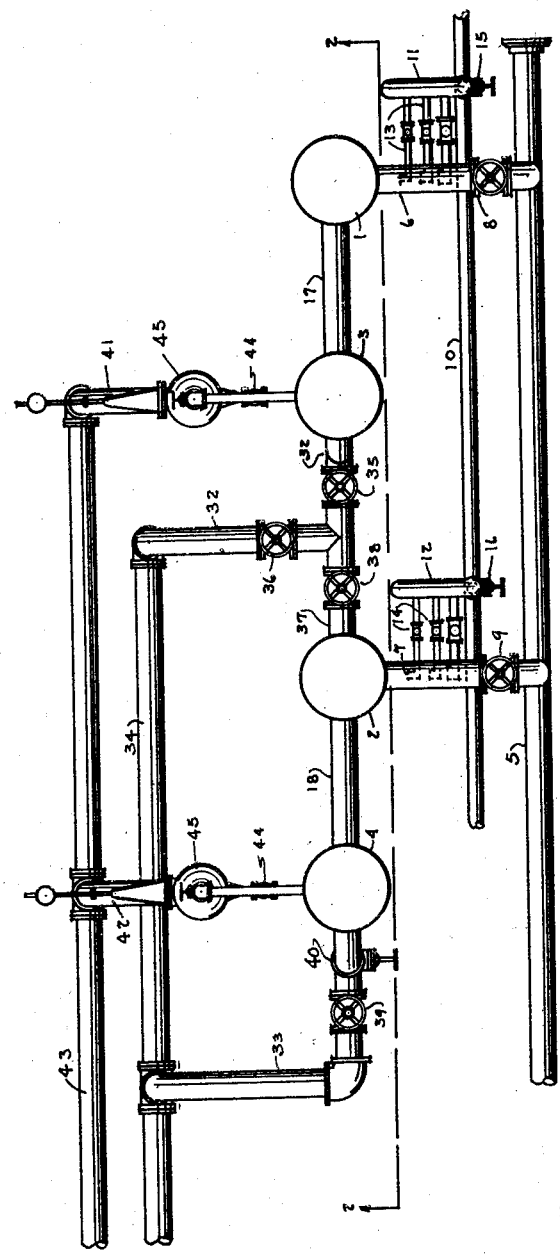
Figure 1 shows a plan view of the apparatus.

Two units are shown, having a common inlet line, and a common delivery line for the treated gas, said units being so connected that they may be operated simultaneously or independently as hereinafter explained.

Referring more particularly to the drawings, wherein like numerals of reference designate similar parts in each of the figures, the numerals 1 and 2 designate similar scrubbing towers and the numerals 3, 4 designate similar separating towers associated with the respective scrubbing towers.

Water containing a treating element such as soda ash is supplied, under pressure, through a common supply line 5 and branch lines 6, 7 into the lower end of the scrubbing towers 1, 2. These branch lines 6, 7 may be controlled through the gate valves 8, 9. The gas to be treated is received under high pressure through a common supply line 10 by the manifolds 11, 12 and is delivered into the fluid in the branch lines 6, 7 through the chokers 13, 14 leading from said manifolds. The supply of gas to the respective manifolds 11, 12 may be controlled by the gate valves 15, 16 respectively.

The pressure of the gas is reduced by the chokers as it enters the branch lines 6, 7 and the temperature thereof is correspondingly lowered. The gas is mingled with the water containing soda ash solution and the mixture passes up through the scrubbing towers and thence out through the respective discharge lines 17, 18 which enter the corresponding separating towers 3, 4 and whose discharge ends are downwardly turned. The lowering of the temperature of the gas above referred to aids materially in the absorption of the hydrogen sulphide by the liquid solution. As the gas and liquid solution pass upwardly through the scrubbing tower they will be thoroughly mixed, and mingled, and the particles of the hydrogen sulphide will be brought into intimate contact with the absorbent, by reason of the novel construction of such scrubbing tower, which will now be described.

Within each scrubbing tower there are the nests of vertically disposed tubes as 19, to 23 respectively. The lower ends of the tubes of the nest 19 are anchored to and extend through a transverse baffle 24 which is anchored in and forms a partition across the scrubbing tower above the corresponding inlet line of said tower. The adjacent ends of the tubes of the respective nests overlap and are arranged in staggered relation and terminate in the respective mixing chambers 25, 26 and 27. These chambers are isolated from each other by means of the transverse baffle plates or partitions 28, 28, 29, 29, 30, 30 respectively. As the gas and liquid solution passes upwardly through the scrubbing tower, and through the series of nests of tubes therein, into and through the respective expansion chambers 25, 26, 27, the gas to be treated and the hydrogen sulphide therein is effectively mingled with the treating solution and brought into intimate contact therewith and this result is further effected by the bubble caps 31 on the upper ends of the tubes of the upper nest through which the mixture passes on its way to the corresponding separating tower.

The liquid and gas are separated in the separating towers, the liquid falling to the bottom and the gas rising to the top. Leading from the top of the separating towers are the outlet lines 32, 33, which unite in a common delivery line 34 through which the purified gas may be delivered to the point of consumption. The delivery line 32 is controlled by the gate valves 35, 36 and connected into said line between said last mentioned valves there is a branch line 37 which is controlled by the valve 38. When it is desired to deliver the treated gas directly from the separating tower 3 into the delivery line 34 the valve 38 should be closed and the valves 35, 36 opened. In some cases however it may be desirable to retreat the gas from the separating tower 3 and in such case, valves 35, 36 are opened and the valves 36 and 16 closed and the gas from the separating tower 3 will thus be delivered into the bottom of the scrubbing tower 2 and through said scrubbing tower as hereinabove explained and is then collected in the separating tank 4 and delivered out through the line 33. This last mentioned line is controlled by the valves 39, 40.

The liquid will gradually collect in the separating towers 3, 4 and will be intermittently discharged therefrom through water lines as 41, 42, which unite in an ultimate delivery line 43. The outlet lines 41, 42 are controlled by the outlet valves 44 which in turn are controlled by the liquid level controllers 45, 45 which are connected into the respective vertical pipes as 45' whose upper ends are connected into the separating towers 3, 4 above the liquid level therein and whose lower ends are connected into the lower ends of said separating towers.

In separating gasoline from natural gas, the gas itself may be admitted into the scrubbing towers as hereinabove explained but in carrying out this process mineral seal oil may be substituted for the liquid solution supplied through the pipe 5 and the mixture passed through the scrubbing towers as above explained. The gasoline will thus be abstracted from the gas, and the gas and liquid separated, in the separating tower. The gas may then be delivered from the separating tower as hereinabove explained and the gasoline distilled out of the oil by a subsequent distilling process.

Only two units of the separating plant have been shown and described, but a single unit or any number of units may be employed depending upon the circumstances of the case.

We have shown what we now consider to be a preferred form of the invention by way of illustration only but it is obvious that mechanical changes and adaptations may be made within the broad principle of the invention as defined by the appended claims.

What we claim is:

1. In treating apparatus a scrubbing tower having an inlet and an outlet to permit the passage of a fluid therethrough, successive nests of tubes forming passageways for the fluid from said inlet to the outlet, mixing chambers, between adjacent nests into which the tubes of such nests are connected, and bubble caps on the discharge ends of the tubes of the ultimate nest of tubes.

2. Apparatus of the character described including a scrubbing tower and an associated separating tower, a liquid inlet line entering the scrubbing tower, a gas supply line terminating in chokers or nozzles, in said inlet line, and through which the gas may be mixed with the liquid, a discharge line leading from said scrubbing tower into the separating tower, means in the scrubbing tower for intimately intermingling the mixture passing through the scrubbing tower from said inlet to said discharge.

3. Apparatus of the character described including a scrubbing tower and an associated separating tower, a liquid inlet line entering the scrubbing tower, a gas supply line terminating in chokers or nozzles, in said inlet line, and through which the gas may be mixed with the liquid, a discharge line leading from said scrubbing tower into the separating tower, means in the scrubbing tower for intimately intermingling the mixture passing through the scrubbing tower from said inlet to said discharge, and means for relieving the liquid and gas separately from said separating tower.

4. Apparatus of the character described including a scrubbing tower and an associated separating tower, means for introducing gas and liquid, under pressure, into the scrubbing tower, an outlet conduit leading from the scrubbing tower and terminating in the separating tower, successive nests of tubes in the scrubbing tower whose adjacent ends overlap, inclosed chambers inclosing said overlapping ends, said tubes and chambers forming means in the scrubbing tower through which the mixture passes in the same direction for intimately intermingling the mixture passing therethrough, means in the scrubbing tower for intimately intermingling the mixture passing therethrough.

5. Apparatus of the character described including a scrubbing tower and an associated separating tower, means for introducing gas and liquid, under pressure, into the scrubbing tower, an outlet conduit leading from the scrubbing tower and terminating in the separating tower, means in the scrubbing tower for intimately intermingling the mixture passing therethrough, said last mentioned means including spaced enclosed chambers in said scrubbing tower and restricted passageways connecting said chambers.

6. Apparatus of the character described including a scrubbing tower and an associated separating tower, means for introducing a mixture of gas and liquid, under pressure, into the scrubbing tower, an outlet conduit leading from the scrubbing tower and terminating in the separating tower, means in the scrubbing tower comprising series of tubes, the ends of the tubes of one series being staggered with respect to those of adjacent series and closed chambers enclosing said adjacent ends, said tubes and chambers confining the mixture to a one way movement and forming means for intimately intermingling the mixture passing therethrough, from the inlet thereof to said separating tower and means for relieving the liquid and gas separately from the separating tower.

7. Apparatus of the character described including a scrubbing tower, means for introducing a fluid to be treated and a treating agent under pressure into the scrubbing tower, means in the scrubbing tower for intimately intermingling the mixture passing therethrough, said last mentioned means comprising spaced inclosed chambers in the scrubbing tower and successively arranged nests of tubes forming restricted passageways connecting said chambers, the ends of the tubes of a nest connected into one chamber being staggered with the respect to the ends of the tubes of another nest connected into said chamber.

8. In a treating plant, a tower, an enclosed chamber therein, a nest of tubes in the tower on one side of the chamber having ends which project into said chamber, a nest of tubes on the other side of the chamber having ends which project into said chamber, said projecting ends of one nest being staggered with respect to those of the other nest, the inwardly projecting ends of a nest of tubes terminating close to the opposing wall of the chamber, means for introducing, under pressure, a fluid to be treated and a treating agent into the tower on one side of said chamber, whereby said fluid and agent may be forced together through one nest of tubes into said chamber and delivered thence through the other nest of tubes from said chamber.

In testimony whereof we have signed our names to this specification.

ARTHUR L. FORBES, Jr.
CLARENCE O. BYRNE.